Jan. 21, 1964 H. F. OLSON 3,118,977

MULTI-GROOVE STEREOPHONIC SOUND RECORDING AND REPRODUCING SYSTEM

Filed July 1, 1960 3 Sheets-Sheet 1

INVENTOR.
HARRY F. OLSON
BY Eugene M. Whitacre
ATTORNEY

MULTI-GROOVE STEREOPHONIC SOUND RECORDING AND REPRODUCING SYSTEM

Filed July 1, 1960

INVENTOR.
HARRY F. OLSON
BY Eugene M. Whitacre
ATTORNEY

INVENTOR.
HARRY F. OLSON
BY Eugene M. Whitacre
ATTORNEY

United States Patent Office 3,118,977
Patented Jan. 21, 1964

3,118,977

MULTI-GROOVE STEREOPHONIC SOUND RECORDING AND REPRODUCING SYSTEM

Harry F. Olson, Princeton, N.J., assignor to Radio Corporation of America, a corporation of Delaware Filed July 1, 1960, Ser. No. 40,303
19 Claims. (Cl. 179—100.4)

The present invention relates to stereophonic sound recording and reproducing systems for use in the home entertainment field. Presently, as is known, such sound recording and reproducing systems are generally of the two-channel type and involve the translation and reproduction of two stereophonically-related audio-frequency signals which provide a high degree of realism in the reproduced sound.

More particularly, the present invention relates to phonograph systems of the type presently important in the home entertainment field for stereophonic sound reproduction from disc records which have two stereophonically-related sound signals recorded in the same groove for translation through two-channel pickup, amplifying, and sound reproducing means. As shown and described in the patent to Keller et al. 2,114,471, the two recordings may be cut at right angles to each other in the same V-shaped record groove, and each at an angle of 45° with respect to the surface of the record. The two recordings are formed by a single cutter stylus which vibrates or moves in two planes which are presently established at an angle to each other of 90° and at equal 45° angles to the surface of the record.

Stereophonic records of this type represent a present standard for the industry and such records and the double-modulated groove thereof will be referred to herein as the 45°–45° stereo records. The resultant complex groove modulation, as is known, may be considered to have vertical and lateral undulation components in varied amplitude relations, which are imparted to, or produced by, the stylus element. The latter is thus compliantly movable vertically and laterally as well as in the two main 45°/45° planes, and is operatively connected to the transducing elements of the stereo pickup, or record cutter device, for the system. The transducing elements provide selective signal translation of the two stereophonically-related signals or groove recordings to, or from, the two signal channels of the stereo system.

It is an object of this invention to provide an improved stereophonic disc-record phonograph system, and one which will give greater realism in sound reproduction than presently known two-channel phonograph systems of the above type.

In stereophonic sound systems presently commercially used, two microphones are spaced laterally, right and left, in front of a sound source area and are connected through separate sound-signal translating circuits, to record the sound from each of the spaced microphones in separate sound tracks on a recording medium, such as magnetic tape. These sound tracks thus represent two stereophonically-related signals from a common sound source as derived from two separate and spaced pickup points. However, three stereophonic sound channels, using a center as well as right and left spaced microphones, are more effective for providing improved auditory perspective in the reproduced sound, as is known.

The present invention relates to three-channel stereophonic sound reproducing systems, and has for its further object to provide an improved multi-channel stereophonic sound system of the disc-record phonograph type which may comprise three signal translating channels for improved auditory perspective and a fourth channel for increased spatial realism, in connection with disc records.

In making a stereophonic recording there are the main or direct sounds from the source, which are picked up by the spaced microphones in auditory perspective, and the multiple reflections of these sounds from the walls of the enclosure surrounding the sound source or sources. The multiple reflections have multiple delay times in arriving at the different microphone locations, and may be referred to generally as reverberant sound, as distinguished from the direct, non-reflected sound. Thus reverberation is part of the ambient sound pattern or envelope, which is the mixed sound in the recording or listening enclosure, and which reaches the microphones with varying degrees of delay. It is desirable to have this in a stereophonic recording for greater realism in the reproduction.

It is, therefore, also a further object of this invention to provide an improved phonograph record recording and reproducing system which provides and effectively utilizes disc records having four separable channel signals or recordings in the same record groove, for stereophonic sound reproduction with improved auditory perspective and depth or reverberation.

A four-channel stereophonic sound reproducing system for use with magnetic tape recording and reproducing means for stereophonic sound reproduction of this type is described in a copending application for Stereophonic Sound Reproducing System, filed concurrently with this application, for the same inventor and assigned to the same assignee as that of this application.

As pointed out in the above referenced application, it has been found that an ambient sound or reverberation envelope for a three-channel stereophonic recording can be simulated effectively by mixing or combining the channels and passing the resultant composite signal through separate signal translating channel including a reverberator. The ambient sound envelope, is then recorded as a separate sound-signal channel on one of the tracks of a four-track tape, the other three tracks of which carry the three-channel recording of the stereophonically-related and simultaneously-recorded direct sound from the same source. Used in reproduction, the four-track recording gives improved realism by adding effective reverberation and depth to improved stereophonic auditory perspective in the reproduced sound from the three direct-sound channels.

The reflected sound or reverberation, which broadly may be termed the delayed ambient sound as produced in the above system, is thus carried by the fourth channel in the recording, and in reproduction is applied to at least one additional or auxiliary loud-speaker or speaker unit located along another and different side of the listening area from the main speakers which provide the auditory perspective. This is generally in rear of the audience, although additional speaker units may be connected for applying the effectively-ambient sound on each side of the audience, as well as in the rear. In the system described, reverberation is prevented, as much as possible, from appearing at the main speakers, and is made to appear only at the auxiliary speakers for the fourth channel, which are placed along other and different sides of the listening area from the auditory-perspective or main-channel speakers. Having four channels, the present system is capable of stereophonic reproduction in a similar manner, but with disc phonograph records, and from a single groove. Its usefulness may thus extend fully into the home entertainment field to provide improved stereophonic sound reproduction at relatively low cost and compatible with existing phonograph systems and records.

In this respect, it is a further object of this invention to provide an improved stereophonic phonograph system for reproducing sound on four channels from disc records, which is compatible with existing phonograph systems for conventional long-playing monophonic and two-channel stereophonic disc records.

It is also a further object of this invention to provide a four-channel improved stereophonic disc-record phonograph system with a single transducer unit having two stylus elements which may operate with higher compliance and reduced stylus pressure and which unit may be rotated to utilize one stylus element for the reproduction of two-channel stereophonic disc records without circuit change or switching operation in connection therewith.

In accordance with the invention, a four-channel disc phonograph system is provided which consists of two two-channel systems, with four sound signals recorded in one record groove which is precut as by an advance cutter stylus. The record groove is of substantially constant width and has a 45°–45° two-channel or double-modulated sound-signal groove in each side wall thereof. It will be seen that the record groove walls per se are unmodulated and thus the groove turns or convolutions may be relatively closely spaced and have a constant pitch.

Viewed in one of its aspects, the present stereophonic sound reproducing system is substantially a four-channel phonograph recording and reproducing system with flat disc records, which may be considered to comprise two two-channel 45°–45° record systems in tandem arrangement using a single pickup unit with two operating styli or stylus elements operating on opposite sides of a single main groove, each in a separate two-channel V-shaped 45°–45° sub-groove. In addition, a third stylus, which is fixed and thus non-operating, engages and tracks the main groove as a guide and effectively supports the pickup and the tone arm means generally used therewith, whereby a high degree of compliance and relatively low stylus pressure may be provided for the operating stylus elements.

A present commercial use for this sound system is in stereophonic phonograph systems to provide three channels for stereophonic sound with improved auditory perspective, and one channel for ambient or reverberant sound effects, for increased spatial realism in the overall reproduced sound from an original recording. In one form of such a system, one of the two 45°–45° sub-grooves has the left and right-hand, or L and R, channel recordings as normally provided for conventional two-channel stereophonic auditory perspective, while the other 45°–45° sub-groove has the third or center (C) channel recording for improved auditory perspective, and the fourth-channel ambient (E) or reverberant sound effects. In this respect the ambient (E) channel signals may be the composite or combination of the three main channel signals, mixed and delayed or reverberated.

In producing the disc records of the present system with four sound channels, the three-track sound signals and the reverberant or ambient sound signals may be applied to suitable disc cutters and recorded on a master record blank either directly or preferably through the intermediary of magnetic tape recorder.

The invention, together with further objects and advantages thereof, will however be further understood from the following description, when considered in connection with the accompanying drawings, and its scope is pointed out in the appended claims.

Figure 7:
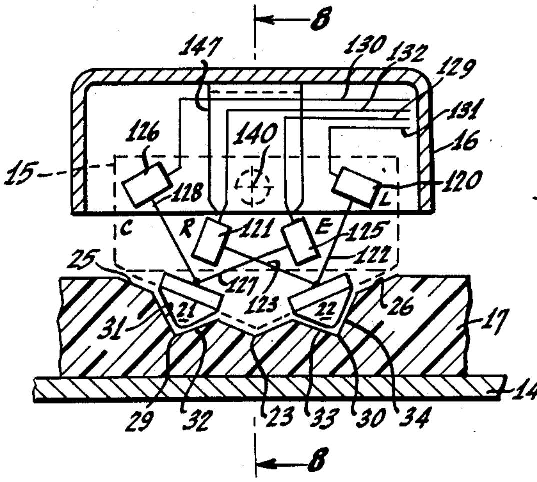
FIGURE 7 is a cross-sectional view, in diagrammatic form and on an enlarged scale, of the four-channel phonograph record, tone arm and phonograph pick-up of FIGURE 1, showing details of the pickup construction and arrangement for reproducing stereophonic sound in four-channels, and from a single groove, in accordance with the invention.
Figure 9:
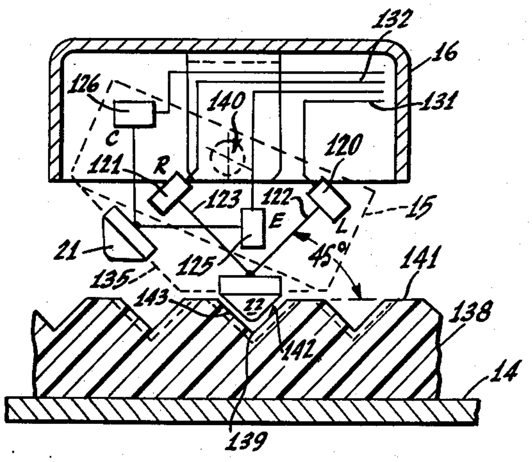
Figure 10:
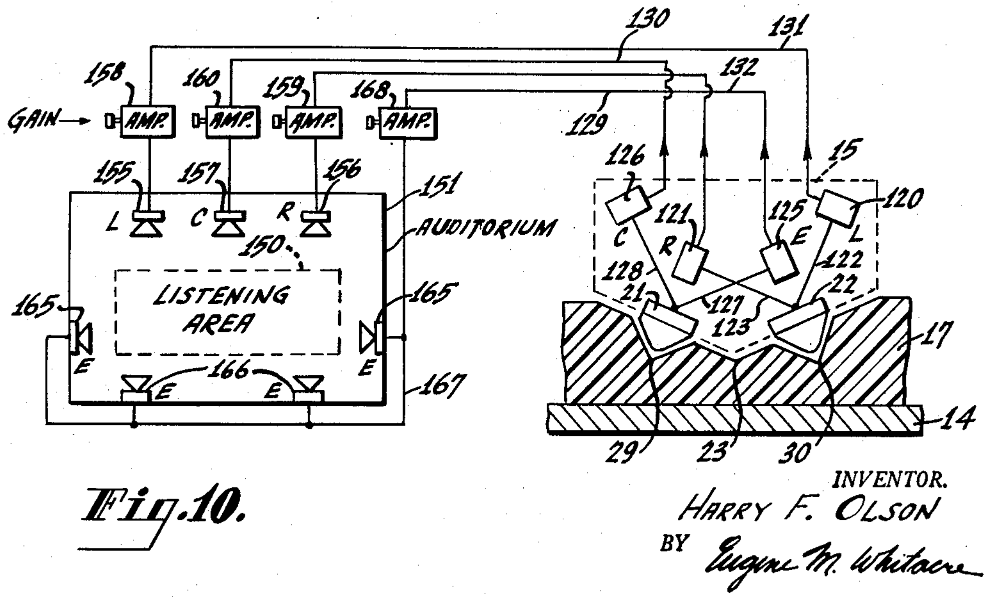

FIGURE 9 is a cross-sectional view, similar to that of FIGURE 7, showing the tone arm and pickup thereof in operative relation to a conventional monophonic or stereophonic two-channel record, for sound translation therefrom in accordance with the invention; and FIGURE 10 is a further schematic circuit diagram of an improved stereophonic sound reproducing system of the four-channel disc-record type in accordance with the invention, diagrammatically showing the use of the four-channel pickup and record of FIGURE 7 therein, for reproducing sound in improved auditory perspective and with improved depth and realism about a listening area.

Figures 1, 3:
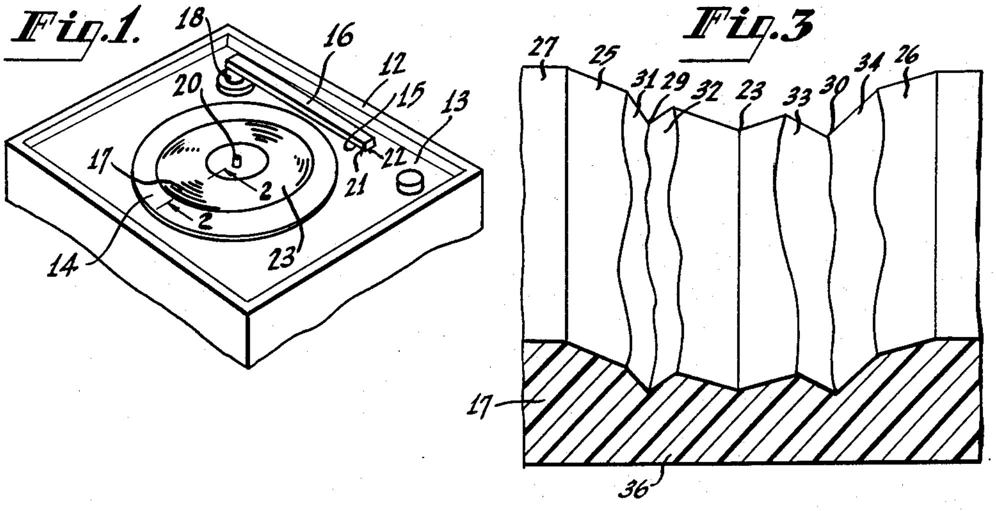
FIGURE 1 is a fragmentary view, in perspective, of a phonograph record-playing apparatus or phonograph, and disc record therefor, embodying the invention.
FIGURE 3 is a top view, in perspective, of the record and groove portions shown in FIGURE 2, to further illustrate certain features of the invention.

Referring to the drawings, in which like parts and elements are designated by like reference characters throughout the various figures, and referring particularly to FIGURE 1, a phonograph or like apparatus 12, having a motor board 13 and a record turn-table 14 mounted on the motor board, is provided with a sound-signal translating or pick-up device 15 carried by the forward end of a suitable tone arm 16. The latter is mounted at its rear end on a pedestal or like pivotal supporting means 18, for vertical and lateral movement of the pick-up device with respect to the turn table 14 and a disc record 17 thereon according to the usual practice, to permit the pickup stylus means to traverse the record and to track the record groove. This represents any suitable disc-record playing arrangement for a phonograph or like record-playing apparatus having turn-table or like means for rotating the record about a fixed axis, and a tone-arm carrying a pickup device for traversing the record in a radial direction as the record rotates. The phonograph apparatus may be of the automatic or of manual-playing type, as is understood, and in the present example is of the latter type as is preferable for playing stereophonic records with a high degree of fidelity.

The record 17 on the turn-table is of the thin flat-disc type, like conventional stereophonic records, and may have a recording cut or pressed in one or both faces, in a single spiral groove in concentric relation to the center spindle opening which fits over the turn table spindle 20 as indicated. In this phonograph system, the pickup 15 is provided with two operating styli or stylus elements 21 and 22 which, in accordance with the invention, may simultaneously effectively engage a single spiral groove 23 on the record, and respond to and reproduce four separate and different recordings from the record groove. The record, as hereinbefore referred to, is a single-goove disc record having a double-modulated sub-groove in each side wall. Thus this system is different from known and conventional phonograph systems for sterephonic disc-record reproduction, and for a further consideration of these differences and the advantages thereof, attention is now directed to the record groove shown in FIGURES 2 and 3, along with FIGURE 1.

Figure 2:
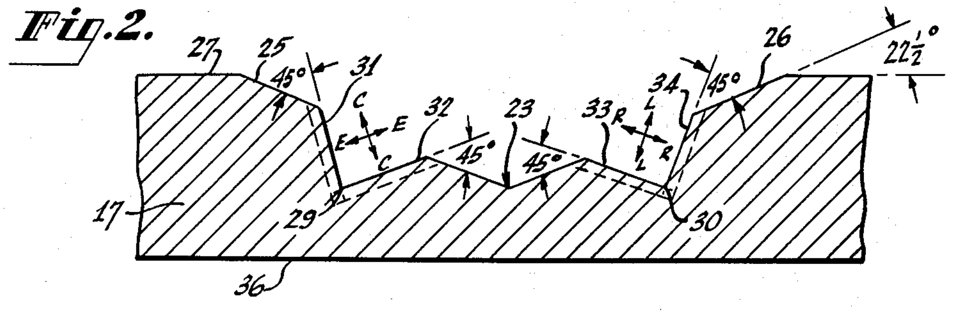
FIGURE 2 is a cross-sectional view of a fragmentary portion of the disc record of FIGURE 1, taken on the section line 2—2, and showing a single record groove on a greatly enlarged scale, to illustrate certain features of the invention.

The sectional and perspective views of the single record groove 23 shown in FIGURES 2 and 3 are taken with respect to the section line 2—2 indicated in FIGURE 1, and are greatly enlarged to better show the groove construction, and thus, certain features of the invention. Like a conventional flat-disc record groove, it includes a single continuous spiral V-shaped groove 23 as indicated in FIGURE 1, which may start preferably near the periphery of the disc and progress inwardly toward the center or spindle opening in the usual playing arrangement for records made for the home entertainment field.

From an inspection of FIGURES 2 and 3, it will be seen that the groove 23 is V-shaped, and is of substantially constant width and has two substantially equal sides or side walls 25 and 26 which have an included angle, are at an angle to each other, greater than 90°. They are then at less than 45° to the record surface 27 and may be substantially 22½ degrees thereto, as shown. The walls of the groove are in any case at equal angles with respect to the record surface and, in the present example, are thus 135 degrees apart, or at 67½ degrees with respect to the vertical or the spindle axis, when the record is on the turntable. The main groove 23 is relatively wide-angled as shown, in order to provide clearance space for the double-stylus transducer and side walls which are of sufficient width to receive conventional-type 45°–45° double-modulated sound grooves 29 and 30. As shown in FIGURES 2 and 3, the left-hand groove 29 has side walls 31 and 32 and the right-hand groove 30 has side walls 33 and 34 which are all at an angle of 45° to the respective main-groove side walls 25 and 26 as shown.

As is understood with regard to sound recordings of this type, the groove walls of each of the sound grooves 29 and 30, are modulated independently at right angles to each other by a single cutter or like stylus means, as later shown, which vibrates or moves in two planes indicated by the arrowed lines in FIGURE 2. These are presently established at an angle to each other of 90°, and are at equal 45° angles to the main-groove wall surfaces 25 and 26 in the present disc sound system. The independent modulation of the groove walls are indicated by the dotted lines in connection therewith.

Referring to the right-hand groove or sub-groove 30, the groove surface or wall 33 is modulated in the direction of the axis indicated by the arrowed line L—L, while the groove surface or wall 34 is modulated in the direction of the axis indicated by the arrowed line R—R which is at a right angle to the line L—L. This double modulation of the groove may represent the L and R, or left and right, channels of a conventional two-channel stereophonic recording. In a four-channel recording, therefore, one sub-groove, such as the groove 30, may be recorded as a conventional stereophonic 45°–45° double modulated sound groove.

The left-hand groove or sub-groove 29 is likewise double-modulated along axis indicated by the arrowed lines E—E and C—C, which are at right angles to each other. In the present example, and in a four-channel stereophonic sound system, this sub-groove may be considered to carry the reverberation and third channel signals hereinbefore referred to. The groove wall 31, therefore, is modulated with the reverberation or ambient signals, in the direction of the line E—E to greater or less depth as indicated by the dotted lines, and the groove wall 32 is modulated with the third channel or center signals in the direction of the line C—C to greater or less depth as indicated by the dotted lines associated therewith.

FIGURE 3 shows, in somewhat better detail, the modulation in the groove 29 and the further modulation in the groove 30. The bottom face 36 of the record portions shown in FIGURES 2 and 3 may be considered to be along a median line of double-faced record, which has sound grooves on both faces as is customary. In any case, the modulation in the groove 23 of the record 17 of FIGURE 1 throughout follows the same general outline as shown in FIGURES 2 and 3, with four channels of recorded sound for reproduction as will be seen hereinafter.

Figure 4:
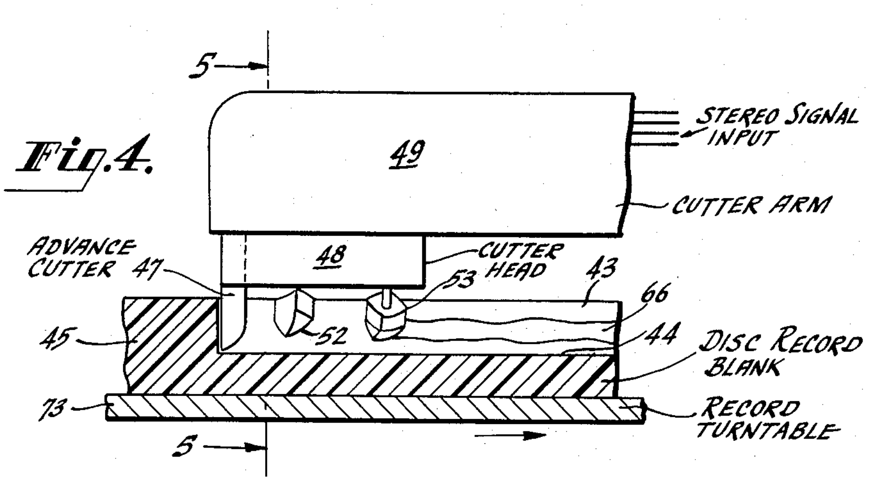
FIGURE 4 is a fragmentary view, in elevation and partly in cross-section, of a disc record cutter or recorder and disc record blank in the process of forming the record groove of FIGURES 1 and 2, in accordance with the invention.
Figure 5:
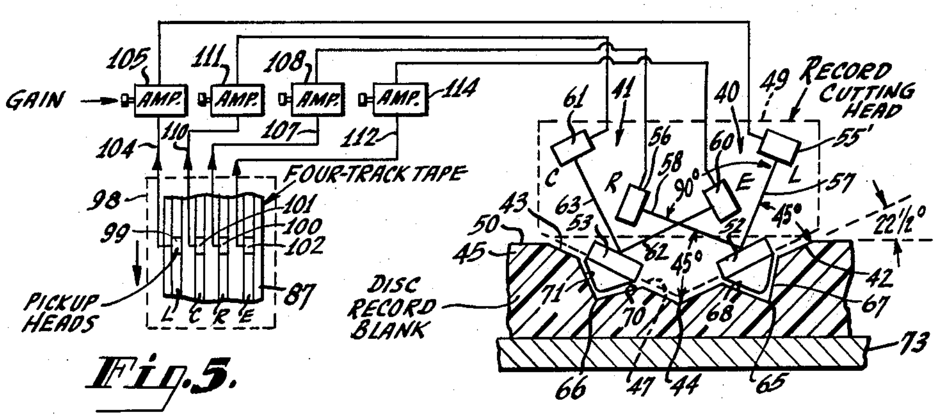
FIGURE 5 is a diagrammatic view, partly in cross-section, of the record blank and cutter of FIGURE 4, taken on the section line 5—5, together with a schematic circuit diagram of a circuit and recording signal source for driving the recorder in accordance with the invention.
Figure 6:
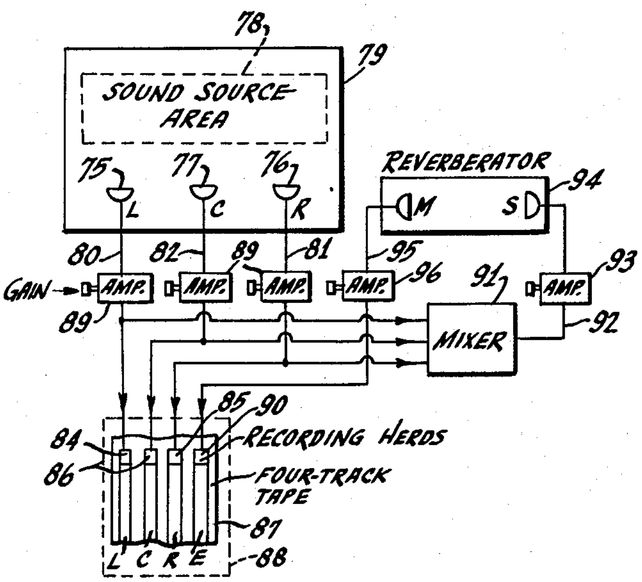
FIGURE 6 is a schematic circuit diagram of a four-channel stereophonic sound recording system suitable, in accordance with the invention, for providing a recording signal for the recording system source shown in FIGURE 5.

Referring now to FIGURES 4, 5 and 6, in making a four-channel recording for use in the sound reproducing system of the invention, two two-channel 45°–45° systems 40 and 41 in tandem are arranged to operate on two sides, or side walls, 42 and 43 of a precut spiral V-shaped groove 44 in a disc-record blank 45 which is cut by an advance fixed cutter 47 which is part of a record-cutter head 48 carried on a cutter arm 49. The groove 44 is like the record groove 23 of FIGURES 2 and 3, having the side walls 42 and 43 substantially equal and at an angle of 22½° to the surface 50 of the record blank 45. In the cutter head, and in rear of the advance cutter 47, are two sub-groove cutter styli or stylus elements, 52 and 53, which are part of the two 45°–45° systems 40 and 41 respectively.

In the system 40, two sound-signal-responsive driver units 55 and 56 are operatively connected with the cutter stylus 52 through axially stiff and transversely flexible wire or rod-like means indicated by the lines 57 and 58, respectively, extending at right angles to each other from the stylus to the driver units. The mechanical connections represented by the wire or rod-like means 57 and 58 may be of any suitable type for driving the stylus 52 individually from the separate signal-responsive driver elements, which may be of any magnetic or other known type for this purpose. These connections act at right angles to each other as shown, and each is at an angle of 45° with respect to the groove wall 42.

The system 41 likewise comprises a cutter stylus 53 which is operatively connected with sound-signal-responsive driver units 60 and 61 through mechanical means represented by a pair of axially stiff, and transversely flexible, wire or rod-like means indicated by the lines 62 and 63, respectively, extending at right angles to each other from the stylus to the driver units.

The cutter stylus 52 operates to cut a 45°–45° sub-groove 65 in the side wall 42 of the main groove, and the cutter stylus 53 is arranged to cut a similar 45°–45° sub-groove 66 in the side wall 43 of the main groove. When signal currents representing sounds to be recorded are supplied to the signal-responsive driver units 55 and 56, the driving connection means 57 and 58 to the cutter are axially vibrated in accordance with these currents. The connection means 58 thus vibrates the cutter stylus 52 to modulate one side 67 of the groove 65 with a sound recording corresponding to the recording signals applied to the driver unit 56, and likewise the connection means 57 vibrates the cutter stylus 52 to modulate the opposite side 68 of the groove 65 with a sound recording corresponding to recording signals applied to the driver unit 55. As is understood with respect to all 45°–45° record systems, there is sufficient flexibility transversely in each of the connection means 57 and 58 to permit substantially independent operation of each of the drivers with respect to the cutter stylus. When both drivers operate, the modulation of the two sides of the groove 65 is carried on simultaneously and varies in accordance with the applied signal currents. As is understood, the resulting groove modulation has lateral and vertical components, and the undulations in one recording plane or side wall will be different from those in the other recording plane or side wall.

In a similar manner, recording signals applied to the driver units 60 and 61 for the cutter stylus 53 operate through the respective connection means 62 and 63 to modulate the side walls 71 and 70, respectively, of the left-hand sub-groove 66 and provide the desired recordings therein. The recording groove is thus in the form shown in FIGURES 2 and 3. This recording, in a master disc record, can be transferred to similar stamper discs for record pressing in a conventional manufacturing process. With any recording unit of this type, the cutter styli cut plain or unmodulated grooves, at 65 or 66 in the side walls of the groove 44, when no signal currents are applied to the driver units. When either driver unit for either cutter stylus is energized, that stylus is vibrated at an angle of 45° to the main groove wall with which it is associated and moves along a line which is an axial extension of, or parallel with, the rod-like connecting means therefor. As is understood, when both driver units for either 45°–45° system are energized, the respective stylus will have components of motion in axial extension of, or parallel with, both connecting means therefor and which motion may be resolved into vertical and lateral components with respect to the subgrooves 65 and 66 and the groove side walls 42 and 43 respectively, as indicated by the basic groove structure shown in FIGURES 2 and 3.

As shown more clearly in FIGURE 4, the disc record blank 45, which may be considered to be similar in size and shape to the record shown in FIGURE 1, is driven by suitable means, such as a recording turn-table 73, which moves or rotates in the direction of the arrow, whereby the advance cutter 47 provides the precut groove 44 ahead of the sub-groove cutters 52 and 53. Thus a single-groove disc recording, having a double-modulated sub-groove in each side wall of the groove, may be made to provide for four-channel sound reproduction. As above indicated, the disc-record blank recording or master disc may be processed in any suitable way to provide therefrom duplicate disc-record pressings for use in the phonograph system of FIGURE 1.

The sound signals applied to the driver elements 55, 56 and 61 are, respectively, the left, right and center stereophonically-related signals for reproduction in auditory perspective and as derived originally from three spaced sound-pickup microphones 75, 76 and 77. The microphones are arranged in laterally-spaced relation to each other along the front of an outlined sound source area 78 in a recording room or other like enclosure 79, as shown in FIGURE 6. The sound source area 78 may be occupied by any desired sound source or sources to be recorded, such as an orchestra or choral group, and the three spaced microphones are connected to pick up the direct sound from the source in improved auditory perspective and deliver this sound in three separate channels or circuits 80, 81 and 82 to any suitable recording means, such as the recording cutter-stylus driver units 55, 56 and 61 directly, or, as in the present example, to tape recording heads 84, 85 and 86, respectively, through suitable recording amplifiers 89. In this case, the sound signals are recorded on three tracks L, R and C of a four-track magnetic recording tape 87 in a suitable recorder 88.

In the present system, the fourth track E, of the four-track tape 87, is supplied with recording signals through a fourth tape-head 90 from the combined and delayed and reverberated three-channel stereophonically-related signals, which provide an effective ambient sound envelope from the stereophonic recording and a simulated reverberation signal. To this end, the sound signals picked up by the three microphones 75, 76 and 77 are mixed or combined in a mixer 91 and translated therefrom through a single-channel circuit 92 and an amplifier 93 to reverberator means 94. The latter may be of any suitable type, either electrical or mechanical, or a combination of both such as the sound or echo chamber means indicated. The signal is taken through an output circuit 95 from the reverberator means 94, and applied through a fourth recording amplifier 96 to the record head 90 for the fourth channel. The track E of the tape 87 thus carries the ambient or effective reverberation signal representative of the sound picked up by the microphones in the recording area.

As pointed out hereinbefore, the four-channel signals derived in this manner may be applied directly to the recording cutter head 49, in which case the fourth-channel signal from the reverberator and recording means 94 and amplifier 96 would be applied directly to the stylus driver element 60 for channel E. However it is generally the practice to record original recordings on tape and to transfer these recordings from the tape to the utilization means, which in this case, is the recording head 49 and its four driver units. In accordance with this arrangement, after recording, the tape 87 may thus be placed in a suitable tape player 98, as shown in FIGURE 5, having four sound signal pickup heads 99, 100, 101 and 102 associated respectively with the tape sound tracks L, R, C and E, for applying the pre-recorded four-channel sound signals to the recorder head 49. For this purpose, the left-channel pickup head 99 is connected through an output circuit 104, and a variable-gain recording amplifier 105 therein, to the left-channel driver unit 55 for the cutter stylus 52. In a similar manner, the right-channel pickup head 100 is connected through an output circuit 107, and a variable-gain recording amplifier 108 therein, to the right-channel driver unit 56 for the cutter stylus 52. The driver transducers may be dynamic, magnetic, crystal, ceramic or any suitable other type as generally used for record cutters.

For recording, on the record blank or master disc 45, the remaining two of the four-channel sound signals from the sound tracks on the tape 87 in the tape player 98 as shown in FIGURE 5, the center-channel pickup head 101 is connected through an output circuit 110, and a variable-gain recording amplifier 111 therein, to the center-channel driver unit 61 for the cutter stylus 53 in the recorder head 49. In a similar manner, the ambient or reverberant sound-channel pickup head 102 is connected through an output circuit 112, and a variable-gain recording amplifier 115 therein, to the reverberation-channel driver unit 60 for the cutter stylus 53 in the recorder head 49.

Thus as the pre-recorded tape 87 is played through the tape player 98, the center channel and ambient or reverberant sound signals are applied to the recorder head 49 along with the left and right-channel signals as above referred to, to provide the four-track disc recording.

Having considered the improved phonograph record recording and reproducing system in its arrangement for providing disc records having four separable channel signals or recordings in the same record groove, consideration may now be given to the sound translating and reproducing means which may effectively utilize such records in accordance with the invention. Accordingly, attention is now directed to FIGURES 7, 8 and 9, along with FIGURES 1, 2 and 3, wherein the phonograph pickup of FIGURE 1 is diagrammatically shown on an enlarged scale for an understanding of the operating principles thereof, the method of translating the recordings in the single-groove four-channel disc record of the invention, and its compatibility for use with conventional stereophonic and monophonic disc records.

The record 17 may be assumed to be a pressing made from a master-disc recording, such as the disc recording 45 in the recording system of FIGURE 5. The details of the groove structure are shown in FIGURES 2 and 3 and its parameters have been described. In the four-channel phonograph record reproducing system here considered, the right-hand sub-groove 30 may thus be considered to carry the left and right, or L and R, stereophonically-related sound signals, and the left-hand sub-groove 29 may be considered to carry the center-channel and reverberant or ambient sound signals, as a counterpart of the disc recording shown in FIGURE 5.

The pickup 15 is, therefore, similar in construction and arrangement of operating elements to the cutter head 49 which was used for the original recording in the master disc record. The two reproducing or operating stylus elements or styli 21 and 22 are thus provided to operate in connection with the same type of record groove and each stylus element is connected with and forms part of a 45°–45° system. In the present example, the right-hand stylus 22, which is arranged to track the sub-groove 30 of the main record groove 23, is resiliently mounted and operatively connected with two signal-transducing units 120 and 121 through suitable mechanical connecting means, which are axially-stiff and transversely-flexible wire or rod-like means indicated by the lines 122 and 123, respectively, extending at right angles to each other from the stylus 22 to the translating units. The mechanical connections, represented by the wire or rod means 122 and 123, provide for transmitting the double record-groove undulations or side wall modulation from the stylus to the respective translating units in accordance with the 45°–45° system, and thus act at right angles to each other, and each is at an angle of 45° with respect to the main groove wall 26.

The stylus 21, which is arranged to track the sub-groove 29 in the opposite wall 25 of the record groove 23, is resiliently mounted and operatively connected with signal translating units 125 and 126 through similar mechanical connecting means as provided for the stylus 22, which may also be axially-stiff and transversely-flexible wire or rod-like means, indicated by the lines 127 and 128 respectively, extending at right angles to each other from the stylus 21 to the translating units 125 and 126. The mechanical connections represented, likewise provide for transmitting the double undulations or side-wall modulation of the record groove 29 from the stylus to the respective transducing units in accordance with the 45°–45° system. Thus these connections act at right angles to each other and each is at an angle of 45° with respect to the main groove wall 25. Signal output circuits for the transducing units or elements 120, 121, 125 and 126 are indicated at 131, 132, 129 and 130 respectively. In practice these extend along the tone arm 16 and through or around the pedestal 18 at the tone-arm pivot for connection to utilization means in the system, as will hereinafter be described.

The pickup transducing units or elements 125 and 126, like the pickup elements 120 and 121, may be of any suitable dynamic, magnetic, crystal, ceramic or other suitable type as used in conventional phonograph pickups. In any case the units are each adapted to translate into sound signals with fidelity, the groove modulation vibrations transmitted thereto selectively along the axes of the respective mechanical connection means 122, 123, 127 and 128. The pickup units thus are at substantially right angles to each other in each pair of the two 45°–45° systems which are included in the single pickup 15. Each 45°–45° system produces two substantially independent signals in accordance with motion components along two axes that are displaced 90° to each other, and 45° to the walls of the main groove.

Figure 8:
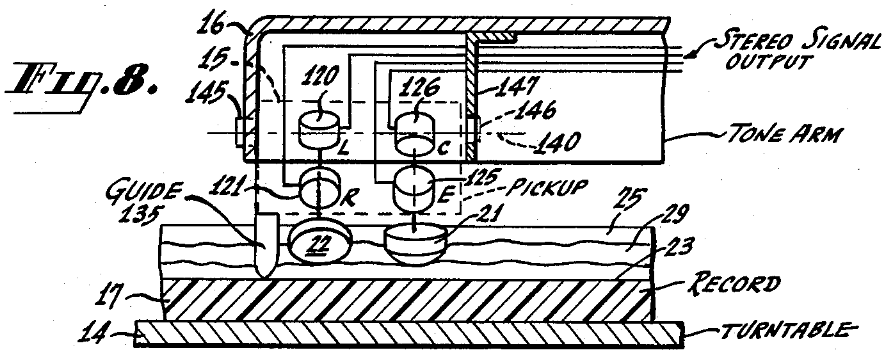
FIGURE 8 is a cross-sectional view of the record, tone arm and pickup of FIGURE 7, taken on the section line 8—8, showing further details of the construction and arrangement thereof.

As shown more clearly in FIGURE 8, the pickup 15 is provided or rigidly connected with a fixed guide element or stylus 135 constructed to seat in and follow the main groove 23 in contact with the unmodulated smooth walls thereof, whereby the movable operating stylus elements 21 and 22 may be made highly compliant to faithfully track the sub-grooves and be actuated by the individual sub-groove undulations or modulation substantially independently of the tracking of the pickup itself. In other words, the pickup follows or tracks the record groove through the medium of a forward fixed stylus or guide element 135 in much the same relation thereto as the advance cutter when a master disc is recorded. When the record is playing, the guide stylus 135 is preceded by the two operating or sound-translating styli or stylus elements 21 and 22, since the record moves in relation thereto as shown in FIGURE 8. This also shows the staggered or front-to-rear spacing of the two 45°–45° systems and the respective stylus elements, whereby both may be provided in the same pickup device in the overlapping relation indicated in FIGURE 7, without interfering with the independent action of each system with the other.

The fixed stylus or guide 135 may make full running contact with the main groove and, therefore, may serve to guide and support the tone arm and pickup by engaging and tracking the main groove. It guides the pickup 15 and the stylus elements 21 and 22 in the general direction of the sound tracks, whereby there is no tone-arm drag on the operating stylus elements, which may freely respond individually to the individual groove modulation and actuate the transducer elements, as described.

The guide or tracking stylus pressure is taken by the unmodulated walls of the main groove and for this reason the system is adapted for use with record changers or similar record playing equipment which may tend to require a relatively heavy pressure to the pickup device to obtain firm tracking. This permits relatively heavy tracking pressure on the pickup device per se, with light tracking pressure on the operating styli or stylus elements. The latter may thus be highly compliant and of low mass as is desirable for relatively-wide frequency response. It may be noted that the use of the double stylus tends in any case to reduce the stylus operating pressure in the sub-grooves if the main guide or tracking stylus should be out of contact with the main groove or otherwise inoperative.

From the foregoing description, it will be seen that the left and right-channel recordings are translated through the pickup elements or units 120 and 121 respectively. Likewise, it will be seen that the center-channel and ambient or reverberant-channel recordings are translated through the pickup elements or units 126 and 125 respectively. It will also be seen that the left and right-channel signals, which are conducted through the output circuits 131 and 132, are effectively two-channel stereophonically-related sound signals as may be derived from a conventional stereophonic record. The pickup and the system may readily be made compatible for translating such records, and for a consideration of this mode of operation, attention is now directed particularly to FIGURE 9.

In this figure, a two-channel stereophonic record 138 is shown on the turn-table 14 in association with the pickup device 15 for sound-signal translation thereby. The single groove 139 of the record may be of the conventional 45°–45° two-channel type. This groove is engaged by the pickup stylus 22 alone, as the pickup is arranged to be turned on a horizontal, front-to-rear, or longitudinal axis 140 to bring the mechanical connection means 122 and 123 for the stylus 22 into a proper 45°–45° relation to the record surface 141. The stylus 22 may then operate with respect to the groove modulation in a conventional manner to drive the transducing units 120 and 121 through the 45°–45° connection means 122 and 123 respectively. Thus the stereophonic channel recording or modulation on the right-hand groove wall 142 is translated by the pickup element 121 and the stereophonic channel recording or modulation on the left-hand groove wall 143 is translated by the pickup element 120. The two stereophonically-related signals derived through the output circuits 131 and 132 may therefore, be applied to any suitable two-channel stereophonic sound reproducing system (not shown) in any well known manner, or to a portion of the system of the invention as will be seen hereinafter.

This system, utilizing the stylus element 22 and its connected translating elements, may also be utilized for playing or translating conventional monophonic recordings, in the same manner as above described for conventional stereophonic recordings, except that the output circuits from the translating devices 120 and 121 may be connected together in like polarity relation for conventional signal output in response to lateral movement of a 45°–45° stylus, such as the stylus element 22. In the present example, the circuits 131 and 132 would be connected in parallel to any well-known type of single ended output circuit, and amplifying and loudspeaker means for monophonic signal reproduction.

It will be noted that when the pickup 15 is turned in a clockwise direction, as viewed in FIGURES 7 and 9, so that the stylus 22 can engage a conventional record groove, the second stylus 21 is moved sufficiently to clear the record surface to be inoperative. Sound reproducing circuits connected with the transducer elements associated therewith may, therefore, be maintained alive or energized if desired and permitted to operate without disconnection or switching when using the system to play conventional records, since there can be no signal output from the translating system controlled by the stylus 21 under this condition of operation. In the case of monophonic record reproduction from normal lateral-cut records, simple switching already known and used with two-channel stereo systems may serve to connect the two output circuits together as above referred to.

The pickup 15 may be pivotally mounted in any suitable manner for rotation about the horizontal and longitudinally-extending axis 140, between the positions shown in FIGURES 7 and 9, for the purpose described. In the present example, a pivot means is shown in outline form as having two pivot pins or studs 145 and 146, at opposite, front-and-rear, ends of the pickup, centrally thereof and on the axis 140, mounted for rotation in suitable openings or bearings in the forward end of the tone arm 16 and in an internal bracket 147 connected with and carried by the tone arm. This represents a presently preferred and effective way for pivotally mounting the pickup device for rotation into the alternative position, as shown in FIGURE 9, for selectively engaging a single record groove with one of the pickup styli or stylus elements.

In the four-channel reproduction of stereophonic sound from disc records in accordance with the invention, it will thus be seen that the system may be relatively simple, consisting of the four-channel pickup 15 with conventional tone-arm mounting and turntable, together with conventional amplifier and loudspeaker means, arranged to provide four sound channels in accordance with the invention, for transulating and reproducing the left, center, right and reverberation-channel information recorded on the record. As shown in FIGURE 10, to which attention is now directed along with FIGURE 1, a four-channel disc-record stereophonic sound-reproducing system in accordance with the invention, is shown to illustrate the use of the four-channel pickup and record therein for reproducing sound in improved auditory perspective and with improved depth and realism.

Arranged in front of a general listening area 150 in an auditorium home living room, or other like walled enclosure represented by the dotted rectangular figure 151, and in spaced relation to each other substantially corresponding to the original location and spacing of the three channel microphones of the original recording, are three sound-reproducing or loud-speaker units 155, 156 and 157 for the left, right and center sound-signal reproduction, respectively, in the listening area from the record 17 and the multiple-channel groove 23 therein through the pickup unit 15. To this end, the left-channel speaker unit 155 is connected through a variable-gain amplifier 158 to the output circuit 131 of the left-channel pickup transducing element 120. The right-channel speaker unit 156 is connected through a second variable-gain amplifier 159 to the output circuit 132 of the right-channel pickup element 121. The third or center-channel speaker unit 157 is connected through a third variable-gain amplifier 160 to the output circuit 130 of the center-channel pickup element 126.

The listening area 150 is provided with the ambient or reverberant sound which is reproduced through loudspeaker means positioned in spaced relation to the main speaker units 155–157. In the present example, the rear and sides of the listening area, within the listening room or auditorium, are provided with further sound reproducing or loud-speaker units 165 and 168, the units 165 being at opposite sides of the listening area and the units 166 being at the rear of the listening area, as shown. In the present example, all units are connected in parallel to a separate signal supply circuit 167 which is connected through a variable-gain amplifier 168 to the output circuit 129 of the ambient or reverberation-channel transducer element 125 of the pickup 15.

With the system energized, and the record playing, the three sound signals, translated from the recordings, through the transducing elements 120, 121 and 126, are reproduced in improved auditory perspective in the listening area 150 by the three spaced loud speaker units 155, 156 and 157. At the same time, the reverberant or ambient sound-signal is translated from the left-side recording of the sub-groove 29 through the transducer 125 and reproduced through the side and rear speaker units 165 and 166. The four signal channels thereby operate to establish or create in the listening area a reproduction of the original sound with improved auditory perspective, depth and realism from a single-groove disc phonograph record, and without the use of complicated apparatus.

The phonograph record playing equipment per se may be of any conventional type involving the usual record turn-table and tone-arm means for traversing the pickup device over the record in the usual radial direction. The only other added equipment is that involving conventional types of audio-frequency amplifiers and loudspeaker units which may be proportioned to the size of the listening area and audience and the sound power output required. In the fourth or ambient sound channel, while four speaker units are shown, it is practical to use a single speaker unit, at the rear or any other desired location, for small listening areas and audiences.

The stereophonic sound-reproducing system of the present invention provides and effectively utilizes disc records having four separable signals or recordings in the same record groove and a single-unit transducing means or pickup device therefor which provides signal translation therefrom in separate signal channels. It is capable of greater realism in sound reproduction than any known two-channel phonograph system for stereophonic disc records, and is compatible therewith and with monophonic phonograph systems for disc records.

Having described the invention, what is claimed is:

1. A record having a single spiral V-shaped groove on at least one face thereof the side walls of which are at equal angles to the record surface and greater than 90° to each other, and a V-shaped sub-groove in each of said side walls each modulated with a different sound recording.

2. A disc recording comprising a flat disc record having a single spiral V-shaped groove on at least one face thereof the side walls of which are at equal angles to the record surface and greater than 90° to each other, said groove being of substantially constant width and pitch for close groove spacing, and a double-modulated 45°–45° sub-groove in at least one of said side walls carrying two separable sound recordings for sound reproduction.

3. A four-track disc recording for stereophonic sound reproduction with improved auditory perspective and reverberation effects, comprising a flat disc record having a single spiral V-shaped groove on at least one face thereof the side walls of which are at equal angles to the record surface and greater than 90° to each other, and a double-modulated 45°–45° sub-groove in each of said side walls carrying separable sound signals, two of which in one sub-groove are stereophonically related.

4. A four-track disc recording for stereophonic sound reproduction with improved auditory perspective and reverberation effects, comprising a flat disc record having a single spiral V-shaped groove on at least one face thereof the side walls of which are at equal angles to the record surface and greater than 90° to each other, and a double-modulated 45°–45° sub-groove in each of said side walls carrying separable sound signals, two of which in one sub-groove are stereophonically-related, and one of which in the other sub-groove is a delayed and reverberated combination of said two sound signals.

5. In a phonograph system for a disc record having a spiral V-shaped main groove on at least one face thereof the side walls of which are at substantially equal angles to the record surface, and a sub-groove in each of the side walls of said main groove, each of said sub-grooves being modulated with a different sound recording, a single-unit electro-mechanical transducing means having two stylus elements one for engaging each of said sub-grooves to provide signal translation from said recordings in separate signal channels, and a guide member for contacting said main groove to support the electro-mechanical transducing means and provide tracking of said record.

6. In a phonograph system of the disc-record type for stereophonic sound reproduction, single-unit electro-mechanical transducing means for flat disc records having four separable recordings in the same groove in pairs providing signal translation therefrom in separate signal channels, said transducing means having two stylus elements one for each pair of recordings, means for rotating said pickup about a fixed longitudinal axis to bring one of said styli into operative relation to engage and track the grooves of monophonic and two-channel stereophonic disc records for signal translation therefrom on two channels, and individual sound-signal amplifying and reproducing means connected with each of said signal channels.

7. In a phonograph system of the disc-record type for stereophonic sound reproduction, a flat disc record having a single spiral V-shaped main groove on at least one face thereof the side walls of which are at equal angles to the record surface and greater than 90° to each other, said groove having a double-modulated 45°–45° sub-groove in each of said side walls each carrying two separable sound recordings for four-channel sound reproduction, single-unit electro-mechanical transducing means for said recordings providing signal translation therefrom in separate signal channels, and individual sound-signal amplifying and reproducing means connected with each of said signal channels.

8. In a phonograph system of the disc-record type for stereophonic sound reproduction, the combination as defined in claim 7, wherein the single-unit electro-mechanical transducing means includes two 45°–45° record-groove transducing systems each having a compliantly-movable operating stylus for tracking a sub-groove individual thereto and selectively translating the recordings therein into said separate signal channels, and wherein said transducing means is provided with a fixed guide stylus for engaging and tracking said main groove.

9. In a disc-record stereophonic sound-reproducing system, the combination with phonograph record-playing apparatus including a rotary turn-table and a pivotally mounted tone arm, of a phonograph pickup mounted on said tone-arm and having two operating styli and transducer elements connected therewith for translating four-track disc records of the type having a single spiral V-shaped groove with a double-modulated subgroove in each side wall thereof carrying separable sound recordings two of which in one sub-groove are stereophonically related, a signal output circuit connected with each of said transducer elements for sound-signal translation therefrom in separate four-channel relation, means for rotating said pickup about a fixed axis to bring the stylus for said sub-groove into operative position for engaging and tracking grooves of monophonic and two-channel stereophonic records on said turntable for compatible sound signal translation therefrom on two of said signal output circuits.

10. A stereophonic disc-record phonograph system, comprising in combination, means providing four signal-translating and sound-reproducing channels, a disc record having a single spiral V-shaped main groove with a double-modulated 45°–45° sub-groove in each side wall providing four sound-signal recordings two of which are stereophonically-related, turn-table means for rotating said record about a fixed axis, pickup means having two 45°–45° pick-up systems providing four sound-signal output circuits and including operating stylus elements compliantly movable on two 45°–45° axes and positioned for tracking said sub-grooves and translating the recordings therein in response to rotation of said record on said turntable means, said pickup means further having a fixed stylus element connected therewith for engaging and tracking said main groove as a guide therefor, and signal-conveying circuit means connecting said output circuits individually each with one of said signal-translating and sound-reproducing channels.

11. A stereophonic disc-record phonograph system, comprising in combination, means providing four signal-translating and sound-reproducing channels, a disc record having a single spiral V-shaped main groove with a double-modulated 45°–45° sub-groove in each side wall thereof providing four sound-signal recordings at least two of which are stereophonically related, turntable means for rotating said record about a fixed axis, tone-arm-mounted single-unit pickup means having a non-operating fixed stylus element and two operating stylus elements compliantly movable on two 45°–45° axes and positioned for tracking said sub-grooves and translating the recordings therein in separate signal channels in response to rotation of said record on said turntable means, said third stylus element being connected with said pickup means for engaging and tracking said main groove as a guide for said pickup means, and means providing individual signal-conveying connections with said signal-translating and sound-reproducing channel means for each of said signal channels from the pickup means.

12. A stereophonic disc-phonograph system as defined in claim 11, wherein three of the signal channels provide three-channel stereophonically-related sound signals and the individual sound-reproducing means therefor include three spaced loudspeaker units for sound reproduction therefrom in auditory perspective with respect to a predetermined listening area, and wherein one channel provides reverberant ambient sound signals and the sound-reproducing means therefor includes a fourth loudspeaker unit spaced from said first-named loudspeaker units and located with respect to said listening area to provide ambient and reverberation sound effects therein conjointly with the three-channel stereophonic sound reproduction.

13. A stereophonic disc-record phonograph system, comprising in combination, means providing four signal-translating and sound-reproducing channels, a disc record having a single spiral V-shaped main groove with a double-modulated 45°–45° sub-groove in each side wall thereof providing four sound-signal recordings at least two of which are stereophonically related, turntable means for rotating said record about a fixed axis, tone-arm-mounted single-unit pickup means having a non-operating fixed stylus element and two operating stylus elements compliantly movable on two 45°–45° axes and positioned for tracking said sub-grooves and translating the recordings therein in separate signal channels in response to rotation of said record on said turntable means, said third stylus element being connected with said pickup means for engaging and tracking said main groove as a guide for said pickup means, each of said movable stylus elements being part of an individual 45°–45° pickup system having a pair of electromechanical transducer elements, said last-named elements being connected with each stylus element for 45°–45° operation thereby in response to sub-groove modulation, and means providing separate signal channel output circuits for each of said transducer elements connected one with each of said signal-translating and sound-reproducing channels.

14. A stereophonic disc-record phonograph system, comprising in combination, means providing four signal-translating and sound-reproducing channels including loudspeaker means terminating each of said channels and located in spaced relation to each other for sound distribution in auditory perspective on three channels and for ambient sound distribution from a fourth channel about a predetermined listening area, a disc record having a single spiral V-shaped main groove with a double-modulated 45°–45° sub-groove in each side wall thereof carrying four corresponding and separable sound recordings therefor, turn-table means for rotating said record about a fixed axis, pickup means having two 45°–45° pickup systems including movable stylus elements positioned for tracking said sub-grooves and translating the recordings therein in response to rotation of said record on said turn table means, said stylus elements each being mounted for compliantly engaging the respective sub-grooves and each being connected with two electro-mechanical signal transducer elements arranged for selective response to and translation of the respective sub-groove recordings, a signal output circuit for each of said transducer elements three of which circuits are connected with the signal-translating and sound-reproducing channels for sound distribution in auditory perspective and one of which output circuits is connected with the signal translating and sound reproducing channel for ambient sound, and a third stylus element fixedly connected with said pickup means for engaging and tracking said main groove as a guide for said pickup means.

15. In a disc-record stereophonic sound-reproducing system, the combination with phonograph record-playing apparatus including a rotary turn-table for flat disc records and a tone-arm pivotally mounted for radial movement across the turn-table, of phonograph pickup means carried by said tone-arm and having two operating styli compliantly mounted for traversing the side walls of a V-shaped record groove in transducing contacting relation to double-modulated sub-grooves one in each of said groove walls, said pickup means further having a pair of electro-mechanical transducer elements connected with each of said styli along axes of operation which are at equal angles with respect to the side walls of the V-shaped record groove for responding selectively to the respective modulation components of each sub-groove, means providing a fixed stylus element in connection with said pickup means for engaging and following said first named record groove as a guide and support for said pickup means and tone-arm, whereby the operating styli are independent of mass-produced stylus pressure, and a signal output circuit connected with each of said transducer elements for signal translation therefrom in separate four-channel relation.

16. In a disc-record sterephonic sound-reproducing system, the combination with phonograph record-playing apparatus including a rotary turn-table and a pivotally mounting tone arm, of a phonograph pickup mounted on said tone-arm and having two operating styli and transducer elements connected therewith for translating four-track disc records of the type having a single spiral V-shaped groove with a double-modulated sub-groove in each side wall thereof carrying separable sound recordings for four-channel reproduction, a signal output circuit connected with each of said transducer elements for sound-signal translation therefrom in separate four-channel relation, a fixed stylus connected with said pickup for engaging and following said record groove as a guide and support for the pickup and tone arm, whereby the operating styli are independent of mass-produced stylus pressure, and individual sound-signal amplifying and reproducing means connected with each of said signal output circuits and arranged for reproducing sound from said recordings in spaced relation about a common listening area.

17. In a phonograph system of the disc-record type for stereophonic sound reproduction, a flat disc record having a single spiral V-shaped groove on at least one face thereof the side walls of which are at equal angles to the record surface and greater than 90° to each other, and said record further having a double-modulated 45°–45° V-shaped sub-groove in each of said side walls each carrying two separable sound recordings for four-channel sound reproduction, said spiral groove being of substantially constant width and the turns thereof being relatively closely spaced, single-unit electro-mechanical transducing means therefor having two compliant operating styli positioned for tracking said sub-grooves simultaneously in response to record rotation about its center for signal translation therefrom in four separate signal channels, and transducing means having a third stylus element for engaging and tracking said first named groove to support and guide said transducing means, and individual sound-signal amplifying and reproducing means connected with each of said signal channels.

18. In a phonograph system of the disc-record type for stereophonic sound reproduction, the combination as defined in claim 17, wherein the transducing means is rotatable on a fixed axis to reposition one of said operating styli for engaging and tracking the grooves of monophonic and two-channel stereophonic records to the exclusion of the other operating stylus and the third stylus, whereby the system is compatible for reproducing sound therefrom.

19. In a phonograph system of the disc-record type for sterephonic sound reproduction, a flat disc record having a single spiral V-shaped groove with a double-modulated 45°–45° V-shaped sub-groove in each of the side walls thereof each carrying a pair of separable sound recordings for four-channel sound reproduction, single-unit electro-mechanical transducing means therefor having two compliant operating styli positioned for tracking said sub-grooves for signal translation therefrom in four separate signal channels, said transducing means having a third stylus element fixedly mounted for engaging and tracking said first named groove to support and guide said transducing means, means including a pivotal mounting element for rotating said transducing means to position one of said operating styli for engaging and tracking a monophonic or two-channel stereophonic record groove to the exclusion of the other of the operating styli and the third stylus element for signal translating therefrom in two of said signal channels, and individual sound-signal amplifying and reproducing means connected with each of said signal channels.

References Cited in the file of this patent

UNITED STATES PATENTS

| | | |
|---|---|---|
| 1,342,442 | Heck | June 8, 1920 |
| 1,345,756 | Emerson | July 6, 1920 |
| 1,765,735 | Phinney | June 24, 1930 |